(12) United States Patent
Zander et al.

(10) Patent No.: US 12,514,626 B2
(45) Date of Patent: Jan. 6, 2026

(54) INTERNAL BRACE PLATE

(71) Applicant: Stryker European Operations Limited, Carrigtwohill (IE)

(72) Inventors: Nils Zander, Eckernförde (DE); James Durham, Cork (IE)

(73) Assignee: Stryker European Operations Limited, Carrigtwohill (IE)

( * ) Notice: Subject to any disclaimer, the term of this patent is extended or adjusted under 35 U.S.C. 154(b) by 271 days.

(21) Appl. No.: 18/139,522

(22) Filed: Apr. 26, 2023

(65) Prior Publication Data

US 2023/0338073 A1  Oct. 26, 2023

Related U.S. Application Data

(60) Provisional application No. 63/334,860, filed on Apr. 26, 2022.

(51) Int. Cl.
*A61B 17/80* (2006.01)
*A61B 17/86* (2006.01)
*A61B 17/00* (2006.01)

(52) U.S. Cl.
CPC ............ *A61B 17/809* (2013.01); *A61B 17/86* (2013.01); *A61B 2017/00526* (2013.01)

(58) Field of Classification Search
CPC .... A61B 17/80; A61B 17/7233; A61B 17/746
See application file for complete search history.

(56) References Cited

U.S. PATENT DOCUMENTS

| | | | | |
|---|---|---|---|---|
| 3,716,050 | A | | 2/1973 | Johnston |
| 4,978,349 | A | * | 12/1990 | Frigg ............... A61B 17/744 606/62 |
| 5,087,260 | A | * | 2/1992 | Fixel ............... A61B 17/746 606/65 |

(Continued)

FOREIGN PATENT DOCUMENTS

| | | |
|---|---|---|
| DE | 3722852 A1 | 1/1989 |
| EP | 3319535 A1 | 5/2018 |

(Continued)

OTHER PUBLICATIONS

Extended European Search Report issued in Appln. No. 23170099.8 mailed Sep. 27, 2023 (10 pages).

*Primary Examiner* — David W Bates
(74) *Attorney, Agent, or Firm* — Lerner David LLP

(57) ABSTRACT

A fracture fixation system comprises an elongated bone plate including a proximal end and a distal end, the proximal end defining a proximal hole, and the distal end extending along a plate axis and defining a distal hole. The system comprises a beam including a peg extending along a peg axis and a screw extending along a screw axis, the beam having a first end and a second end, and a support pin including a first end and a second end. In an implanted configuration of the fracture fixation system, the peg axis is parallel to the screw axis such that the beam defines a figure-8 shape in a plane perpendicular to the peg and screw axes, the first end of the beam is engaged with the proximal hole of the bone plate, the first end of the support pin is engaged with the distal hole of the bone plate, and the second end of the support pin is engaged with the second end of the beam.

17 Claims, 15 Drawing Sheets

(56) References Cited

U.S. PATENT DOCUMENTS

| | | | |
|---|---|---|---|
| 5,300,074 A | 4/1994 | Frigg | |
| 7,316,687 B2 * | 1/2008 | Aikins | A61B 17/1668 606/86 A |
| 7,534,244 B2 | 5/2009 | Ferrante et al. | |
| 7,780,667 B2 * | 8/2010 | Watanabe | A61B 17/72 606/62 |
| 7,918,853 B2 | 4/2011 | Watanabe et al. | |
| 7,931,652 B2 | 4/2011 | Ferrante et al. | |
| 7,951,176 B2 * | 5/2011 | Grady, Jr. | A61B 17/8052 606/280 |
| 8,764,808 B2 * | 7/2014 | Gonzalez-Hernandez | A61B 17/8052 606/280 |
| 8,834,469 B2 * | 9/2014 | Watanabe | A61B 17/744 606/64 |
| 8,939,978 B2 * | 1/2015 | Watanabe | A61B 17/1668 606/65 |
| 9,131,973 B2 | 9/2015 | Rollinghoff et al. | |
| 9,308,034 B2 | 4/2016 | Grady, Jr. et al. | |
| 9,833,270 B2 | 12/2017 | Zlotolow | |
| 9,931,148 B2 | 4/2018 | Grady, Jr. et al. | |
| 10,117,689 B2 | 11/2018 | Zlotolow | |
| 10,172,654 B2 * | 1/2019 | Watanabe | A61B 17/744 |
| 10,182,845 B2 * | 1/2019 | Grant | A61B 17/8061 |
| 10,231,768 B2 | 3/2019 | Grady, Jr. et al. | |
| 10,653,466 B2 | 5/2020 | Grady, Jr. et al. | |
| 10,874,435 B2 | 12/2020 | Grant | |
| 11,033,303 B2 | 6/2021 | Steinlauf | |
| 11,039,865 B2 | 6/2021 | Singh et al. | |
| 11,116,557 B2 | 9/2021 | Zander et al. | |
| 11,141,203 B2 * | 10/2021 | Hansson | A61B 17/7266 |
| 2005/0055024 A1 * | 3/2005 | James | A61B 17/72 606/64 |
| 2007/0270845 A1 * | 11/2007 | Watanabe | A61B 17/725 606/62 |
| 2008/0281326 A1 * | 11/2008 | Watanabe | A61B 17/164 606/65 |
| 2010/0286945 A1 | 11/2010 | Tango et al. | |
| 2011/0060337 A1 * | 3/2011 | Ferrante | A61B 17/1684 606/64 |
| 2011/0238121 A1 * | 9/2011 | Watanabe | A61B 17/72 606/289 |
| 2013/0096629 A1 * | 4/2013 | Rollinghoff | A61B 17/80 606/281 |
| 2021/0259749 A1 | 8/2021 | Lam et al. | |
| 2021/0298802 A1 | 9/2021 | Steinlauf | |

FOREIGN PATENT DOCUMENTS

| | | |
|---|---|---|
| FR | 2650500 A1 | 2/1991 |
| WO | 2007054591 A1 | 5/2007 |
| WO | 2021130730 A1 | 7/2021 |

* cited by examiner

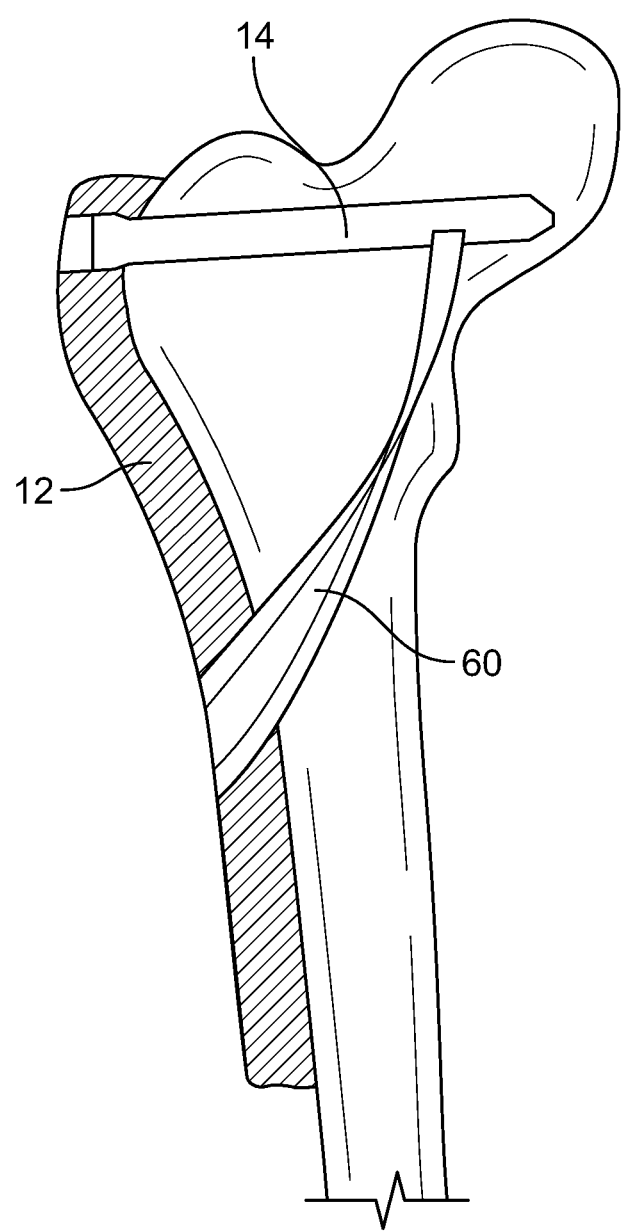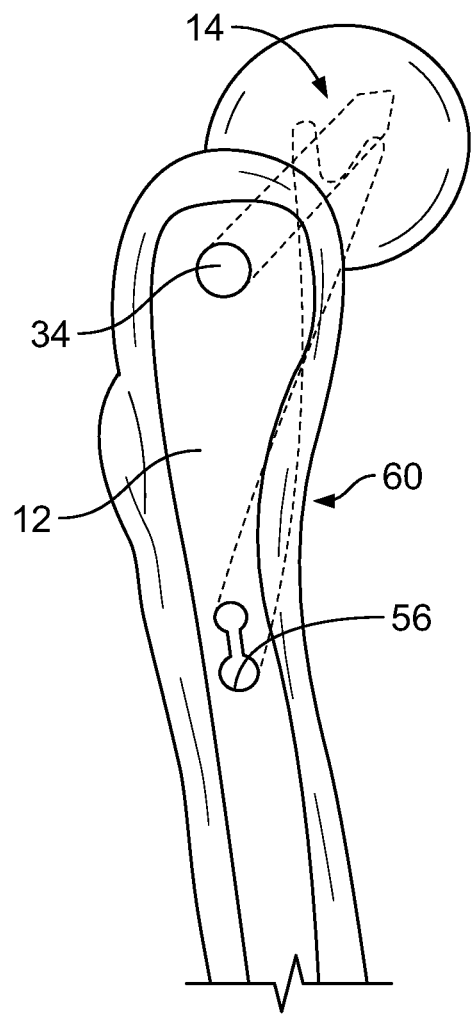
FIG. 11
FIG. 12

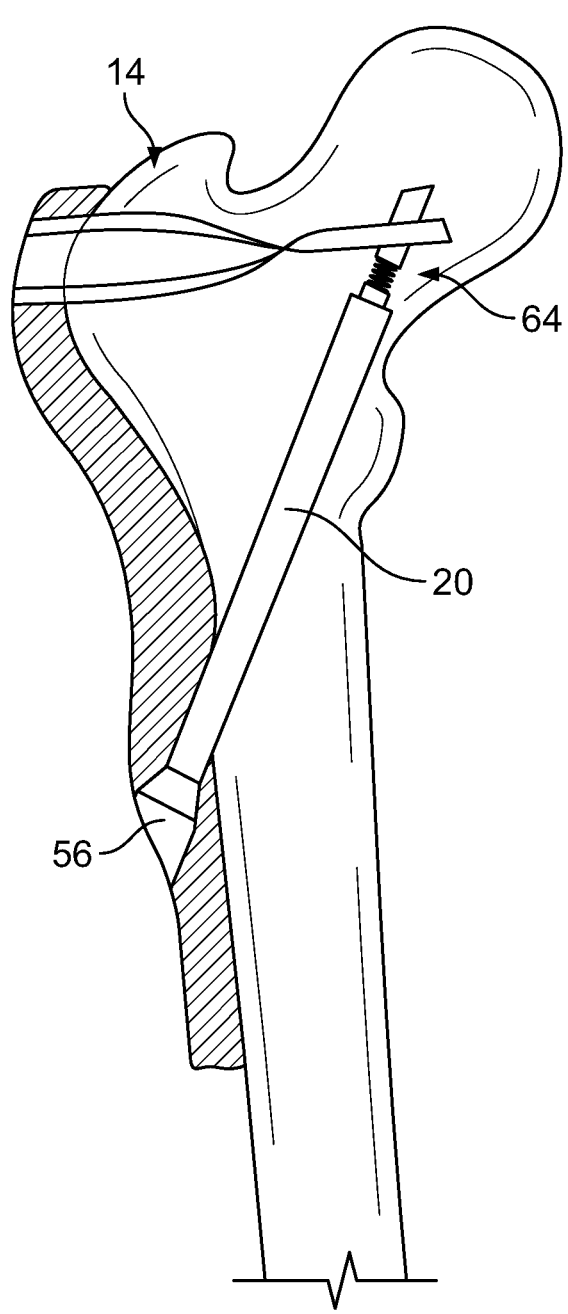
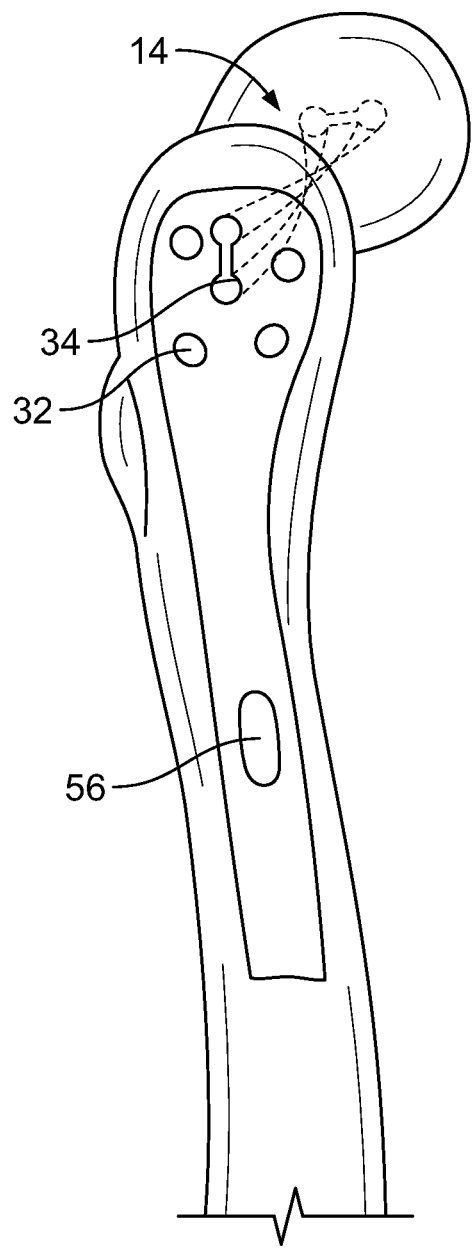
FIG. 13
FIG. 14

INTERNAL BRACE PLATE

CROSS-REFERENCE TO RELATED APPLICATIONS

The present application claims the benefit of the priority of U.S. Provisional Application No. 63/334,860 filed Apr. 26, 2022, the disclosure of which is hereby incorporated by reference herein in its entirety.

BACKGROUND OF THE INVENTION

The present disclosure generally relates to a fracture fixation system and a surgical method for implanting same, and more particularly, to a fracture fixation system including a bone plate attached to the bone with an internal beam and an internal support for stabilization of the fracture.

Surgical methods are known for reconstructing a patient's anatomy after a bone fracture. These procedures often rely on the surgeon's use of metallic plates or meshes which are screwed into a fractured bone in order to reset comminuted areas of the fractured bone. These plates may carry the load of the comminuted area of the bone. Due to the rigidity of the plate minimizing the motion of the fractured bone, the fractured bone can heal in the proper position. These strong plates must usually be contoured to the surface shape of the bone.

Trochanteric and subtrochanteric femur fractures are often treated with an intramedullary nail having a transverse bore for receiving a bone fastener, such as a femoral neck screw usually provided in the form of a sliding screw. The intramedullary nail is fitted in the intramedullary canal of the femur, and the sliding screw is then passed through the transverse bore of the intramedullary nail, through the neck of the femur and into the femoral head.

Sometimes, intramedullary nails cannot be implemented for femur fractures. This could be because a proximal nail entry portal is not accessible or does not provide sufficient support for implantation. It is also possible that comminution of the lateral wall will not allow a proper placement location of a lateral plate with sufficient varus prevention. Treating certain kinds of proximal femur fractures may result in non-unions, varus malalignments, and potential hardware failures.

Certain traditional bone plates have fasteners extending from a proximal portion of the bone plate into the underlying femoral head. Under the load of the patient's body weight, sometimes this fastener can flex, and in extreme cases, can break.

Thus, a fracture fixation system with improved biomechanical performance that reduces stress within the critical cross-section of a lateral bone plate and the proximal screws targeting the femoral head fragment is desired.

BRIEF SUMMARY OF THE INVENTION

In one aspect, a fracture fixation system comprises an elongated bone plate including a proximal end and a distal end, the proximal end defining a first hole; and a beam including a peg extending along a peg axis and a screw extending along a screw axis, the beam having a first end and a second end, wherein in an implanted configuration of the fracture fixation system, the peg axis is parallel to the screw axis such that the beam defines a figure-8 shape in a plane perpendicular to the peg and screw axes and the first end of the beam is engaged with the first hole of the bone plate.

In another aspect, the system further comprises a support pin including a first end and a second end, wherein, in the implanted configuration, the first end of the support pin is engaged with a second hole of the bone plate that is located distally of the first hole in the bone plate, and the second end of the support pin is engaged with the second end of the beam.

In a different aspect, the second hole is located within a proximal-most two thirds of a length of the bone plate as measured between the proximal and distal ends of the bone plate.

In another aspect, the second hole is located within a proximal-most half of a length of the bone plate as measured between the proximal and distal ends of the bone plate.

In another aspect, the peg has a head at the first end of the beam, the head defining a figure-8 shape in a plane perpendicular to the peg axis.

In another aspect, the head of the peg is comprised of a first half of the figure-8 shape defining a first opening coaxial with the peg axis, and a second half of the figure-8 shape defining a second opening.

In a further aspect, the peg defines a lumen extending from the first opening through an entire length of the peg.

In a different aspect, the second opening of the second half of the figure-8 shape is internally threaded.

In a further aspect, the second half of the figure-8 shape is monolithically connected with the first half at a first side thereof, and defines an open gap at a second side thereof opposite the first side.

In another aspect, the first hole of the plate has an outer ledge, and the head of the peg is configured to flex at the gap such that in the implanted configuration the head mates with the first hole past the outer ledge with a snap fit.

In a further aspect, a shaft of the peg connected to the head has a generally cylindrical outer surface intersected by a groove that is parallel to the peg axis.

In a different aspect, in the implanted configuration a portion of the screw is disposed within the groove of the shaft of the peg.

In a further aspect, the peg has an oblong recess in a side of the peg facing the distal end of the plate.

In yet a further aspect, in the implanted configuration the second end of the support pin is disposed in the oblong recess of the peg.

In another aspect, the oblong recess extends only partially through a width of the peg.

In another aspect, the support pin includes a tip at the second end of a diameter that is smaller than a diameter of a portion of the peg adjacent to the tip.

In a further aspect, the beam extends substantially orthogonally from the plate axis.

In yet a further aspect, the beam extends at an angle of 93 to 97 degrees with respect to the plate axis.

In a different aspect, the angle is 95 degrees.

In another aspect, in the implanted configuration the plate, the beam, and the support pin form a triangular shape.

In another aspect, the fracture fixation system further comprises a plurality of locking screws disposed within a plurality of proximal holes of the plate, respectively.

In a different aspect, the fracture fixation system further comprises a k-wire.

In another aspect, the peg is non-threaded.

In yet another aspect, the support pin is a blade.

In another aspect, the blade is twisted.

In another aspect, a method of assembling a fracture fixation system comprises inserting a peg of a beam through a first hole at a proximal end of an elongated bone plate;

inserting a screw of the beam through the first hole of the bone plate, wherein a peg axis along which the peg extends is parallel to a screw axis along which the screw extends such that the beam defines a figure-8 shape in a plane perpendicular to the peg and screw axes.

In another aspect, the method further comprises engaging a first end of a support pin into a second hole located distally of the first hole in the bone plate.

In a different aspect, the method further comprises engaging a second end of the support pin with the beam.

In another aspect, the step of inserting the peg includes inserting a head of the peg into the first hole, the head defining a figure-8 shape in a plane perpendicular to the peg axis; and the step of inserting the screw includes inserting the screw through an opening in the head of the peg.

In a different aspect, the step of inserting the screw includes threading a head of the screw into the opening in the head of the peg.

In another aspect, the step of inserting the peg includes snapping the head of the peg into the first hole.

In a further aspect, the step of inserting the screw includes locating a portion of the screw within a channel on one side of the peg.

In a different aspect, the step of inserting the support pin includes engaging a tip of the support pin into an oblong recess in a side of the peg.

In another aspect, the steps of inserting the peg, the screw, and the support pin result in the plate, the beam, and the support pin forming a triangular shape.

In another aspect, the method further comprises inserting a plurality of locking screws within a plurality of proximal holes of the plate, respectively.

In yet another aspect, the method further comprises installing the bone plate against a bone.

In another aspect, the method further comprises inserting a k-wire through the first hole of the bone plate and into the bone, and wherein the step of inserting the peg of the beam includes inserting the peg over the k-wire.

In a further aspect, the method further comprises inserting a locking screw within a distal hole of the plate.

BRIEF DESCRIPTION OF THE DRAWINGS

The features, aspects, and advantages of the present invention will become better understood with regard to the following description, appended claims, and accompanying drawings in which:

FIG. 11 is a side view showing another embodiment of a fracture fixation system where the support pin is a twisted blade.

FIG. 12 shows a proximal view of the fracture fixation embodiment of FIG. 11.

FIG. 13 is a side view showing another embodiment of a fracture fixation system where the support pin includes a spring.

FIG. 14 shows a proximal view of the fracture fixation embodiment of FIG. 13.

DETAILED DESCRIPTION

As used herein, when referring to bones or other parts of the body, the term "proximal" means closer to an operator and the term "distal" means further away from to the operator. The term "inferior" means toward the feet and the term "superior" means towards the head. The term "medial" means toward the midline of the body and the term "lateral" means away from the midline of the body.

Figure 1:
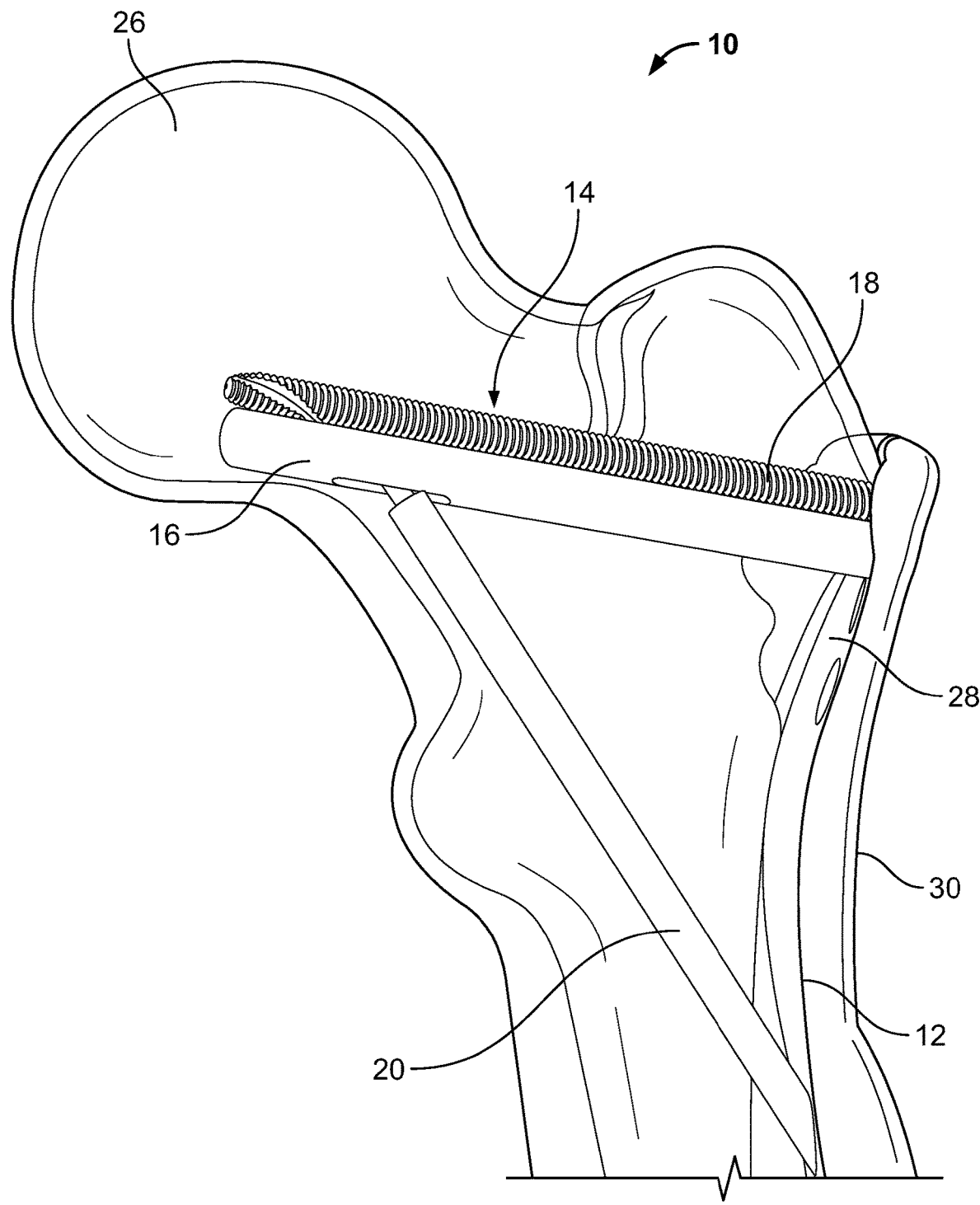
FIG. 1 is a perspective view from a side angle of a fracture fixation system.

FIG. 1 illustrates a perspective view of fracture fixation system 10 for securing a fractured femur. Although the embodiments depicted herein describe and illustrate a femur, it is envisioned that the fracture fixation system 10 may be implemented with other bones, such as the humerus. Fracture fixation system 10 includes an elongated bone plate 12, a beam 14 positioned to extend therefrom and into the bone, and support pin 20 positioned to extend from bone plate 12 to support beam 14. Beam 14 includes a peg 16 that extends along a peg axis and a screw 18 that extends along a screw axis, each axis generally parallel to the other.

Figure 2:
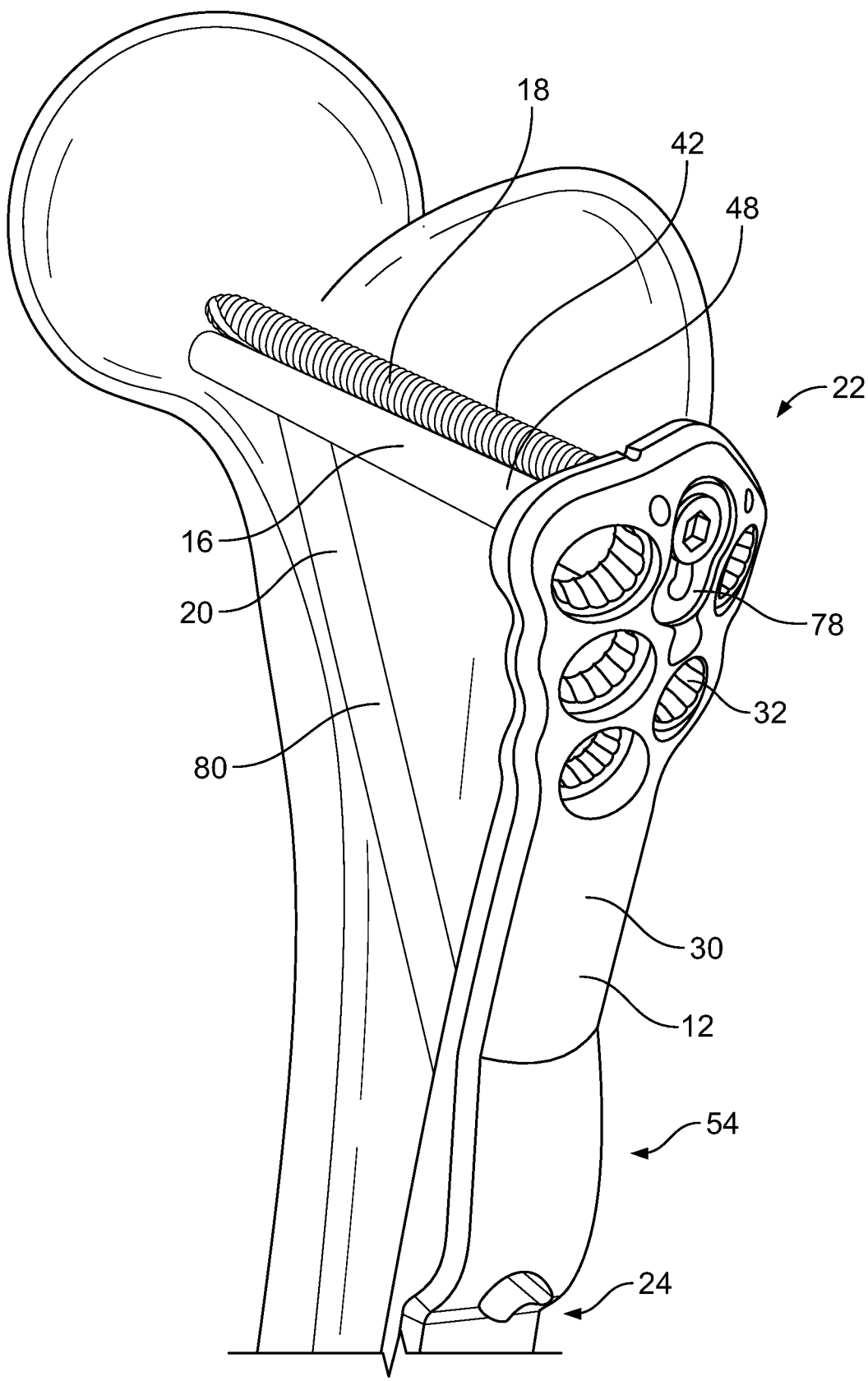
FIG. 2 is another perspective view from a different angle of the fracture fixation system of FIG. 1.

FIG. 2 shows another perspective view of fracture fixation system 10. Bone plate 12 generally defines and extends along a longitudinal axis from a first end 22 to a second end 24, the first end corresponding to a superior direction and the second end corresponding to an inferior direction relative to femur 26. Bone plate 12 has a curvature that is preferably concave on the inner surface 28 of bone plate 12 and convex on the outer surface 30 of bone plate 12 to more closely fit the outer surface of femur 26. However, other plate geometries are envisioned to contour the bone plate to the femur. FIG. 1 also shows curvature at the first end 22 of bone plate 12 that assists first end 22 in contouring to the greater trochanter of the femur. Under a load, bone plate 12 flexes and thus may contour to the underlying bone in regions where there was a gap in an unloaded configuration.

The bone plate 12 is an elongated member that is formed from a single piece of rigid material, such as stainless steel, titanium, or other rigid materials known in the art. The bone plate 12 has a plate thickness that contours to the underlying bone and varies in certain areas. For example, a bulged region 54 is provided at second end 24 of bone plate 12 and has a greater thickness than the surrounding areas of bone plate 12 to allow for fixation of support pin 20.

A plurality of holes 32 are formed through first end 22 of bone plate 12 for receiving a plurality of fasteners 84 extending therethrough into the underlying bone. The fasteners 84 may be bone screws, beams, pegs, nails, or other fastener types known in the art. Holes 32 may include both single holes for accepting a single fastener, or a set of different types of holes, such as a slotted combi-hole, where multiple fasteners can be inserted through a single slot. Holes 32 may have contouring to allow for fastener insertion at variable angles while maintaining a strong connection with the head of the screw. Such contouring is described in U.S. Pat. No. 11,039,865, the disclosure of which is hereby incorporated by reference herein. The holes 32 may also be made from a softer material than the surrounding bone plate to allow the head of the fastener to engage the material and prevent backing out. Washers, plates, or other features may further be implemented to prevent fasteners 84 from backing out of the bone and bone plate. Due to the curvature of the first end 22 of bone plate 12 about the longitudinal axis, each fastener may be driven into the underlying bone at an optimized angle to reach and stabilize the fragmented bone. For example, two bone screws, one on each side of beam 14, may be driven through bone plate 12 at converging angles so that the bone screws converge distally toward a point near beam 14.

Beam 14 may extend from first end 22 of bone plate through the trochanter region of bone into the adjacent femoral head. As depicted, beam 14 may extend at an angle between 90° and 180°, or more preferably, between 93° and 97°, such as 95°, relative to the plate axis defined by the first end 22 of bone plate 12 into the femoral head. Alternatively, beam 14 may extend at other angles relative to the longitudinal axis of bone plate 12 depending on the specific geometry of the patient's fracture.

Figure 8:
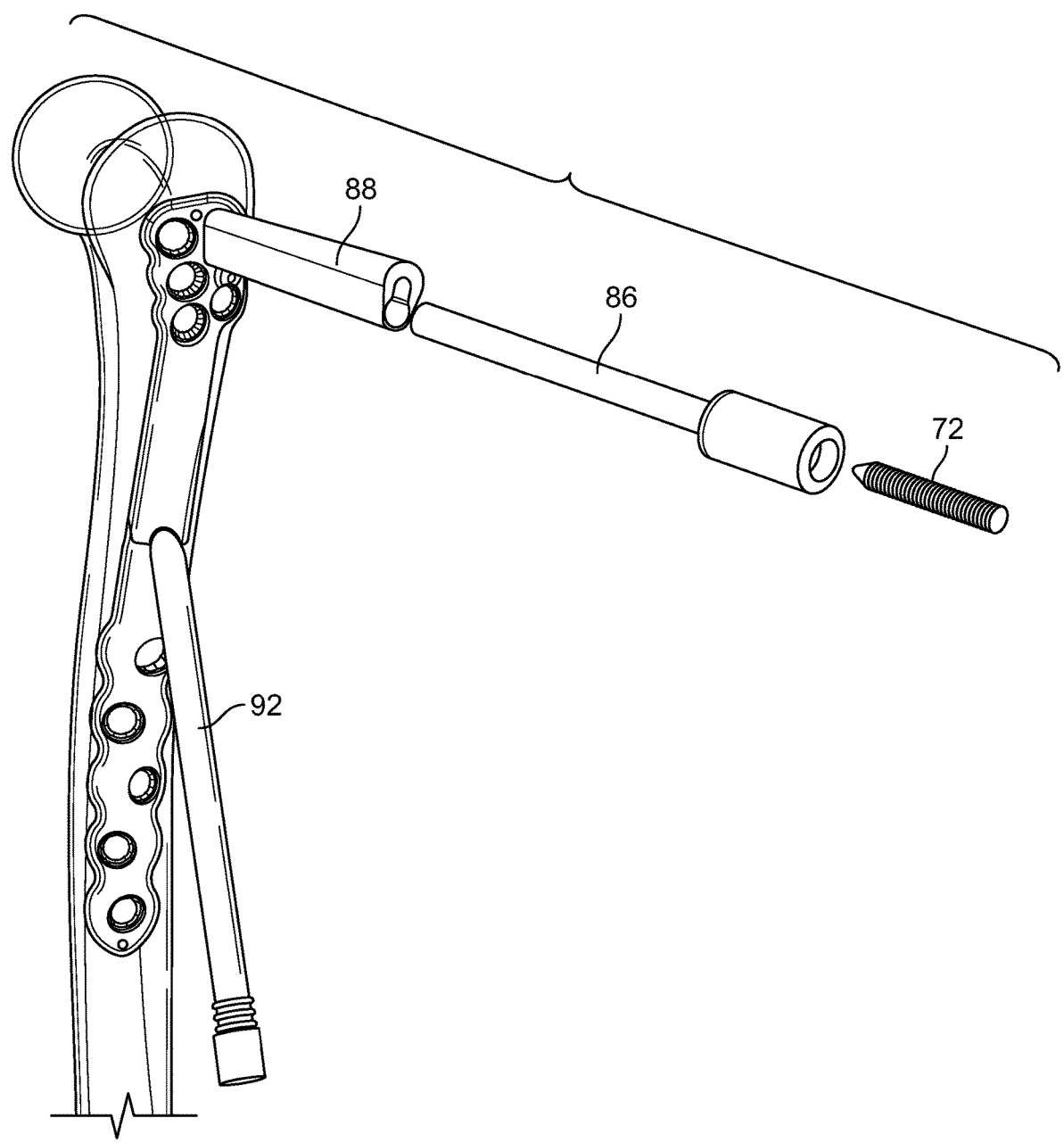
FIG. 8 is a perspective view showing the beam and support pin of the fracture fixation system of FIG. 1 being inserted into the bone plate.
Figure 9:
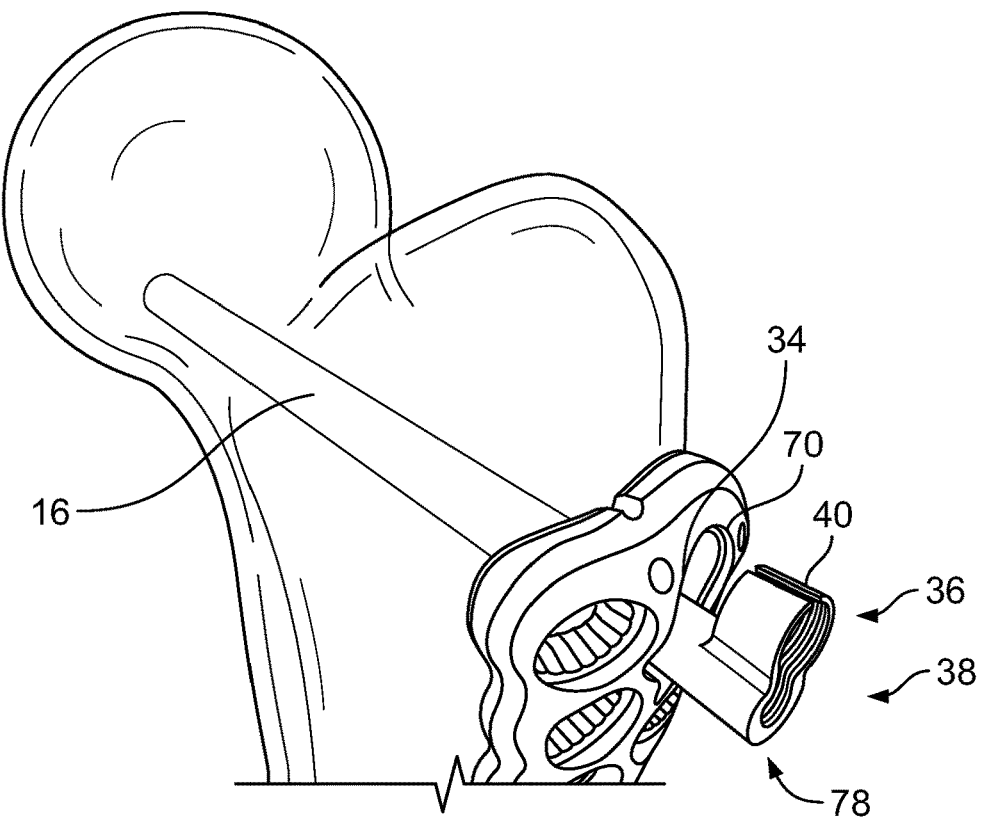
FIG. 9 is a perspective view showing the beam collar being inserted into the bone plate.
Figure 10:
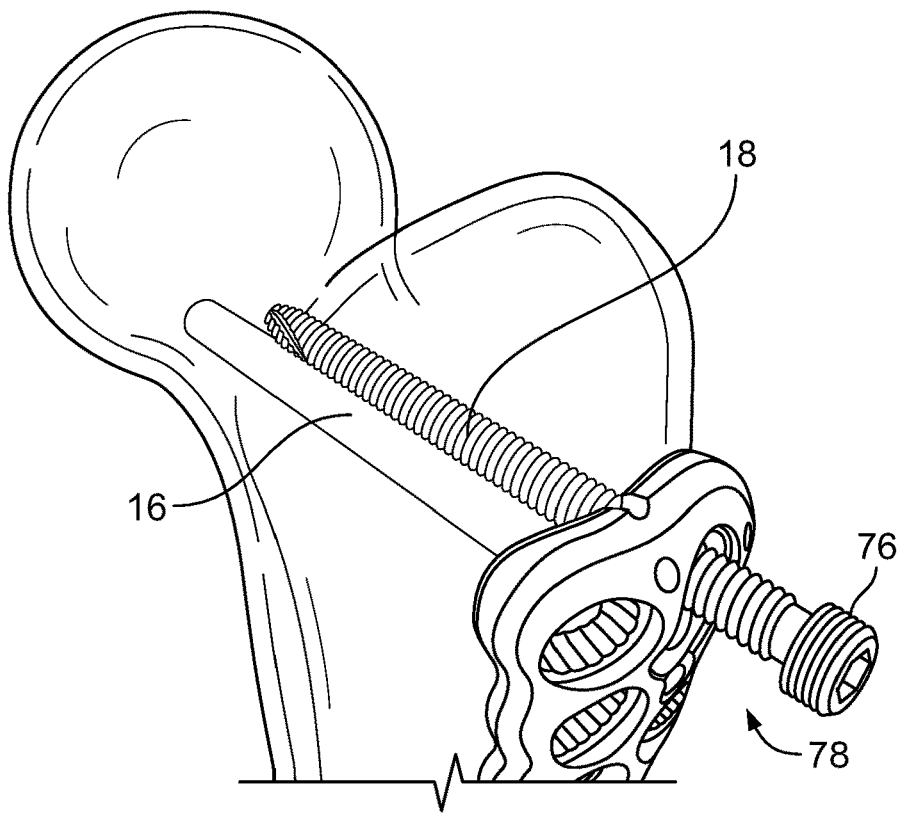
FIG. 10 is another perspective view showing the screw being inserted into the beam collar and bone plate.

FIG. 9 depicts a monolithic beam collar 78 that is used to secure beam 14 within bone plate 12. Due to the monolithic construction of beam collar 78, peg 16 has a figure-8 shaped head that defines first end 36 and second end 38. The aperture corresponding to the first end 36 has a diameter that corresponds to the diameter of screw head 76. It is also envisioned that other beam styles and embodiments could be implemented with beam collar 78, and particularly those with non-circular cross sections. The figure-8 shape defined by the head of peg 16 and beam collar 78 allows beam collar 78 to house screw 18 positioned superior to adjacent peg 16. This orientation also allows for increased fixation throughout the femoral head and trochanter region of bone. To aid in placing screw 18 in beam collar 78, a gap 40 is formed in first end 36 of beam collar 78. Gap 40 allows the first end 36 to accept the screw 18 therein. Accordingly, gap 40 may be formed in such a manner to cause a biasing force in a direction to close gap 40. This biasing force helps ensure beam 14 will not back out of bone plate 12 once in place. Additional features to prevent the beam from backing out, such as lock washers or stopper plates, may also be utilized with beam collar 78 to prevent beam 14 from backing out.

Beam 14 extends from a slot 34 of bone plate 12 medially into bone. The slot 34 forms a non-circular shape, preferably a figure-8 shape, in a plane at bone plate 12 that is generally perpendicular to both a screw axis and a peg axis. In the preferred embodiment depicted in FIG. 9, a first half 36 of the beam collar 78 at a proximal end of beam 14 corresponds to and is coaxial with the screw axis and a second half 38 of beam collar 78 corresponds to and is coaxial with the peg axis. In traditional bone plates and fracture fixation systems, beam 14 may flex under the load of a person's bodyweight. It is thus desirable to include additional support structures to account for the flexion of the beam to discourage beam 14 from shifting, or in extreme cases, breaking. Beam 14 further provides anti-rotation when it is implanted within the femur.

Beam collar 78 may attach to the corresponding slot 34 in bone plate 12 via any number of attachment methods. In a preferred embodiment, the biasing force resulting from gap 40 causes beam collar 78 to snap into place under a ledge 70 of slot 34 when the beam collar is in an implanted configuration. Another ledge (not shown) may be located on the opposite side, e.g., the inward or medial side, of slot 34 to prevent beam collar 78 from contacting bone. In other embodiments, beam collar 78 may have a pressure fit with slot 34 or may require a set screw or other fastener to secure it within slot 34 of bone plate 12. An internal surface of first end 36 of beam collar 78 may have a corresponding internal thread pattern to screw 18 to allow screw 18 to be driven therethrough and the head 76 of the screw 18 to engage with the aperture. Due to the monolithic construction of beam collar 78, peg 16 has a figure-8 shaped head that defines first end 36 and second end 38. The aperture corresponding to the first end 36 and the screw 18 has a diameter that corresponds to the diameter of screw head 76. Further, collars for other shape fasteners, such as a rectangular-shaped blade depicted in FIG. 13, may be utilized in alternative embodiments and may connect to the bone plate in a similar manner as described above.

Beam 14 includes both screw 18 and peg 16. As shown, screw 18 is threaded entirely along its shank 42. Additionally, the head 76 of screw 18 may be threaded to engage with the internal threads of the first half 36 of beam collar 78. The thread pattern on screw 18 may be uniform across the entire shank 42 of screw 18 and the head 76. Alternatively, other thread patterns, such as superimposed lefthand and righthand threads of the orthopedic locking screw described in U.S. Pat. No. 11,116,557, the contents of which are incorporated by reference herein, can be implemented along the shank 42 of screw 18. The diameter of shank 42 of screw 18 may be the same as the diameter of shank 48 of peg 16, or it may differ. A flute or cutout 44 is included at a distal end of screw 18 to facilitate insertion and promote engagement with bone. Cutout 44 may be curved to promote rotation of screw 18 as it is driven into bone. The proximal end of screw 18 includes an opening for receiving an insertion tool. The opening may correspond to the geometry of the tool, and thus may be star-shaped, hex-shaped, or another shape known in the art that will engage with the insertion tool.

Figure 3:
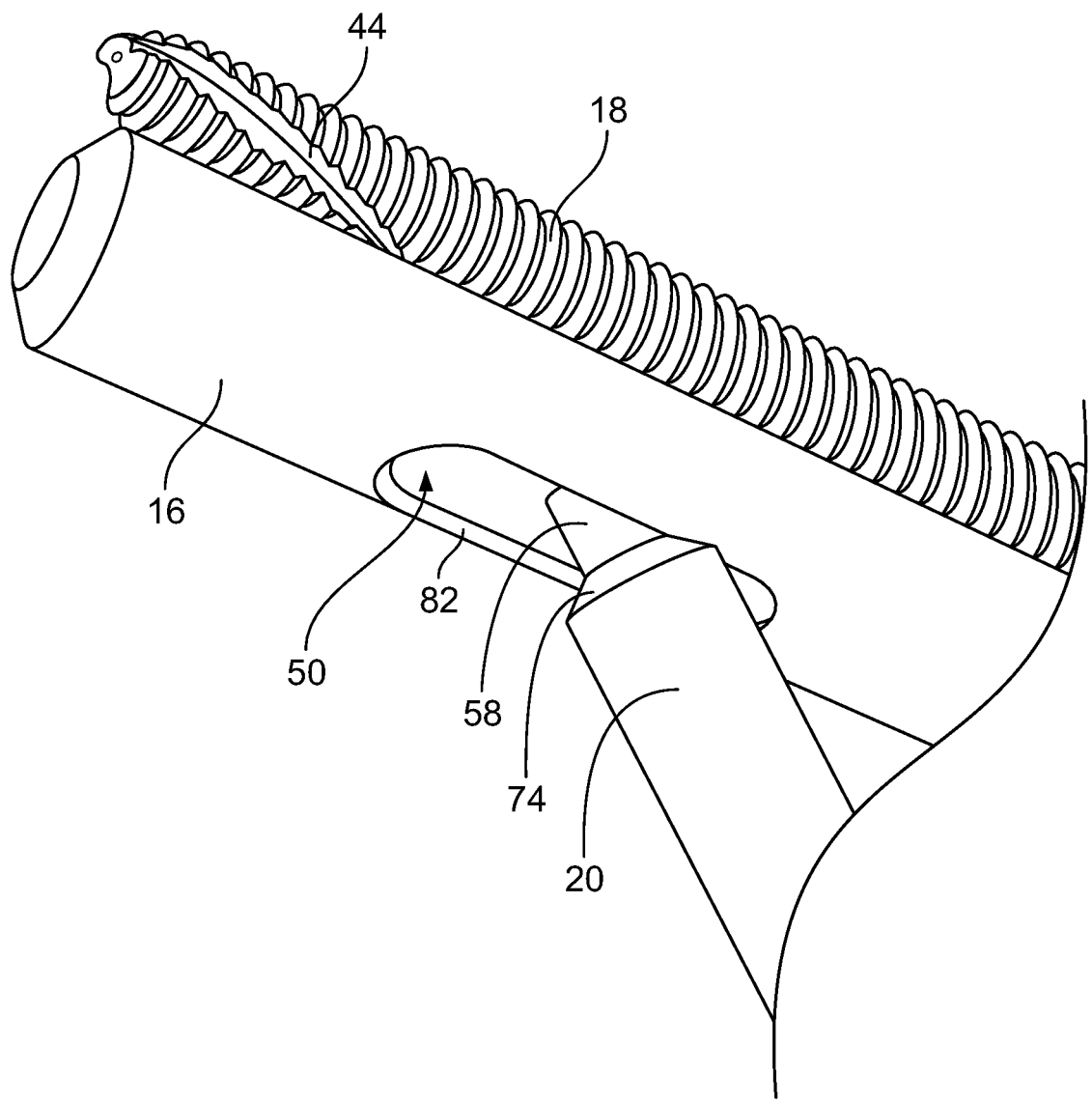
FIG. 3 is an enlarged view of distal ends of a beam and a support pin of the fracture fixation system of FIG. 1.
Figure 4:
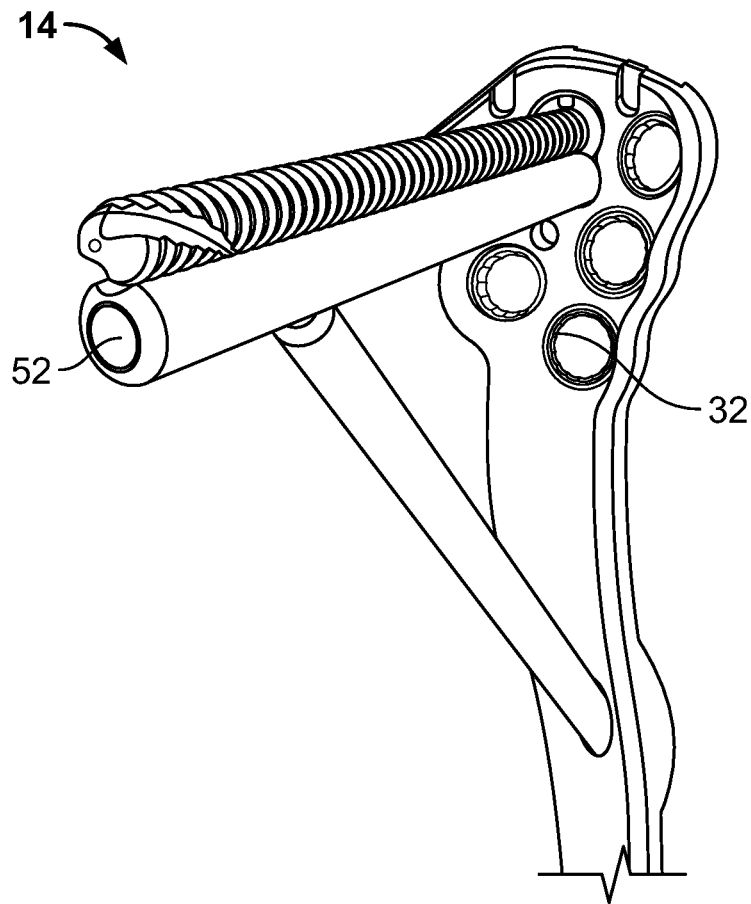
FIG. 4 is another perspective view from a distal angle of the fracture fixation system of FIG. 1.
Figure 5:
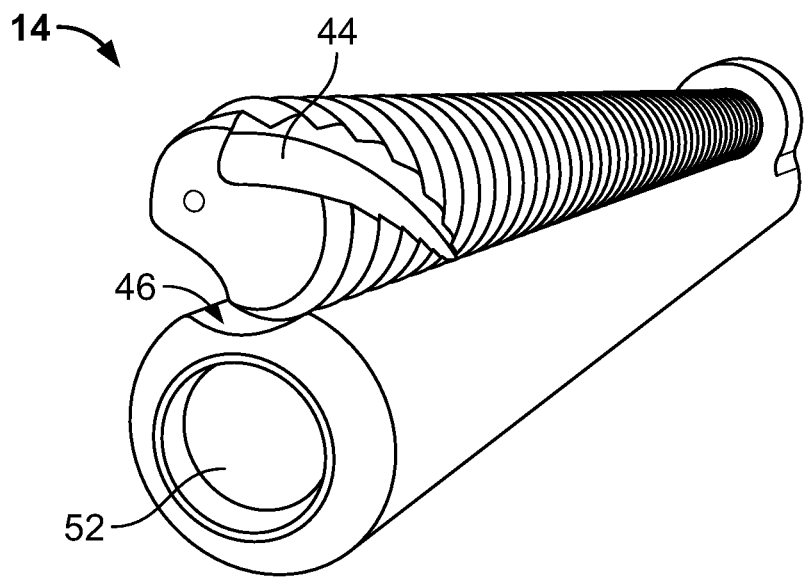
FIG. 5 is a perspective view from a distal angle of the beam of FIG. 3.
Figure 6:
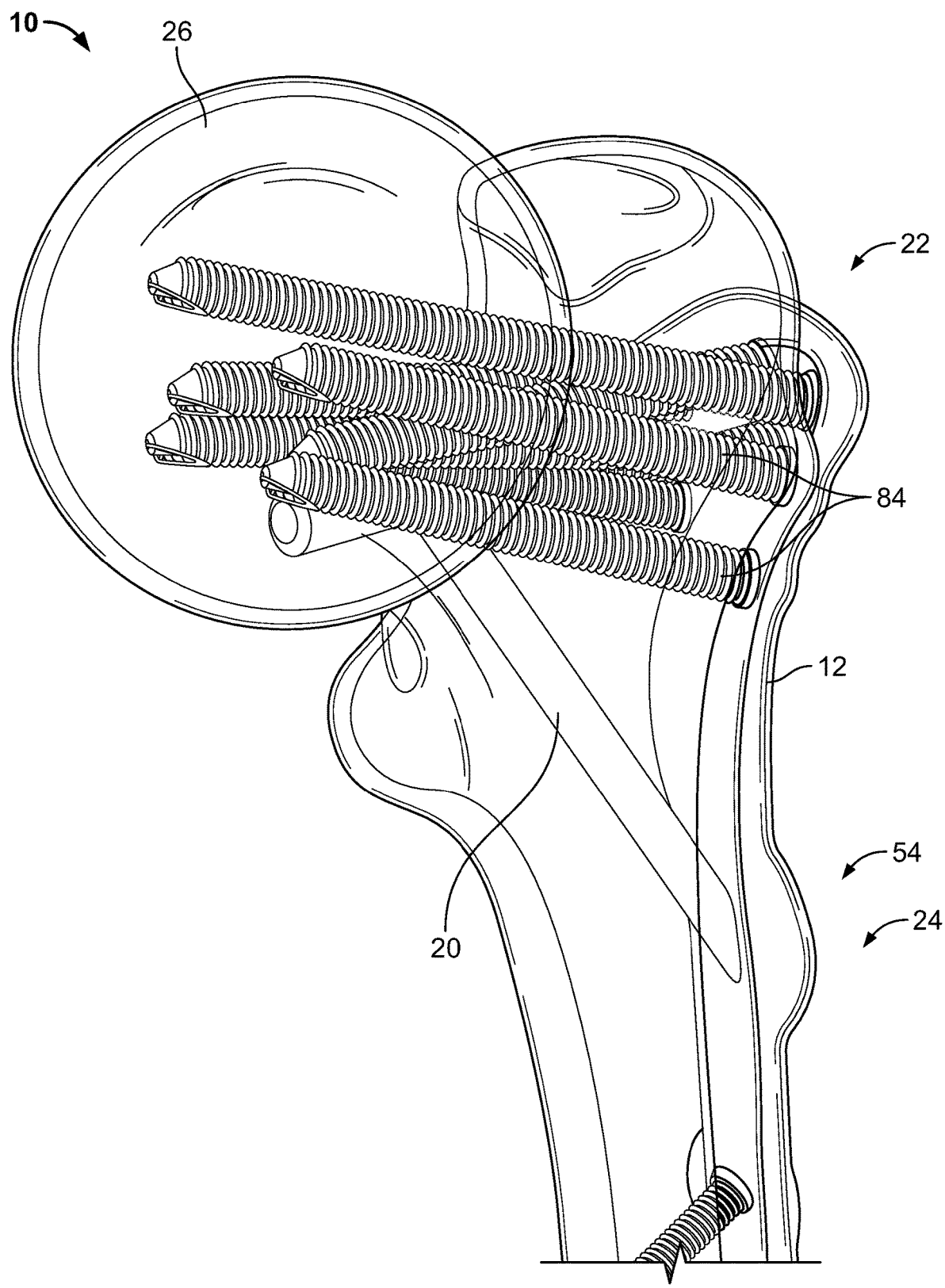
FIG. 6 is a perspective view of another embodiment of the fracture fixation system.

As shown in FIGS. 3 and 5, peg 16 is preferably unthreaded and tapers along its distal end to engage bone. Peg 16 has a groove 46 extending longitudinally along its shank 48. Groove 46 is defined by a cylindrical surface and has a radius of curvature configured to abut the shank 42 curvature of screw 18. In the implanted configuration, screw 18 is juxtaposed in groove 46 of peg 16, but screw 18 and peg 16 do not interact otherwise. As depicted, groove 46 is on a superior region of peg 16, but in alternative embodiments, the figure-8 shape may be rotated so that the peg 16 is superior to screw 18 or medial to screw 18. Groove 46 may extend entirely along the length of shank 48 or it may extend only partially across the length of shank 48, preferably based on the length of shank 48. Groove 46 may also have a ramped bottom portion (not shown) to act as a set screw that engages with a lag screw groove upside down. Peg 16 defines a lumen 52 extending along its longitudinal axis entirely through peg 16, which can be used during insertion over a k-wire. The proximal end of peg 16 is monolithically formed with beam collar 78 to define a figure-8 shaped head, and thus peg 16 is nonrotatable by itself.

Figure 16:
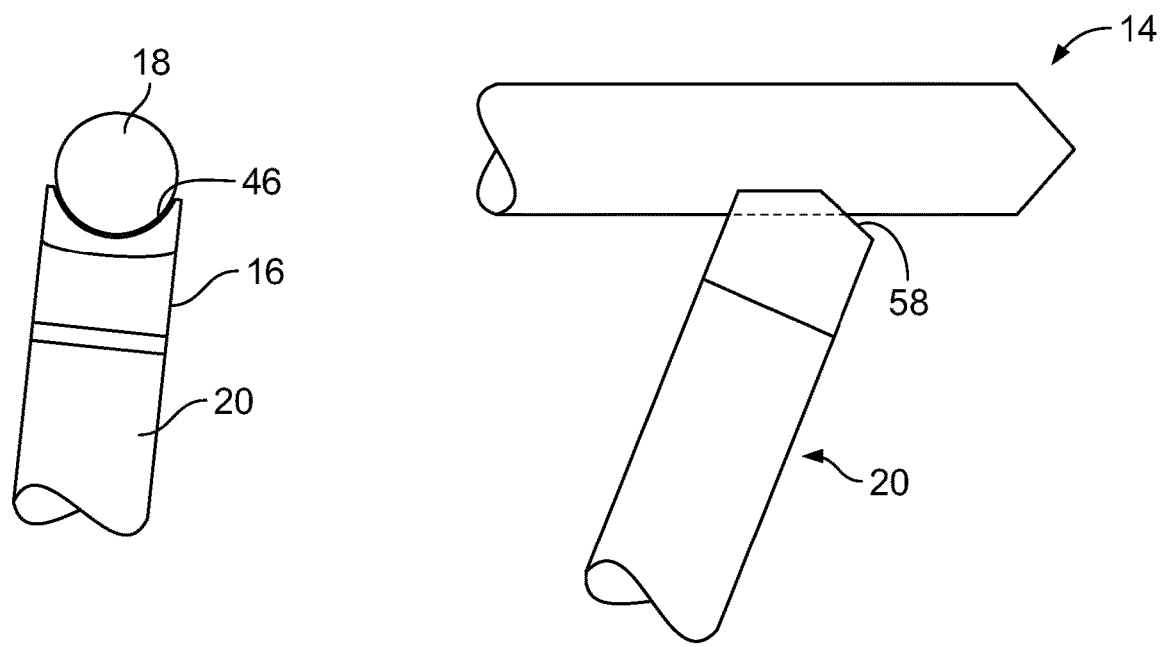
FIG. 16 shows alternative embodiments of a fracture fixation system where the support pin does not extend entirely through the beam.
Figure 17:
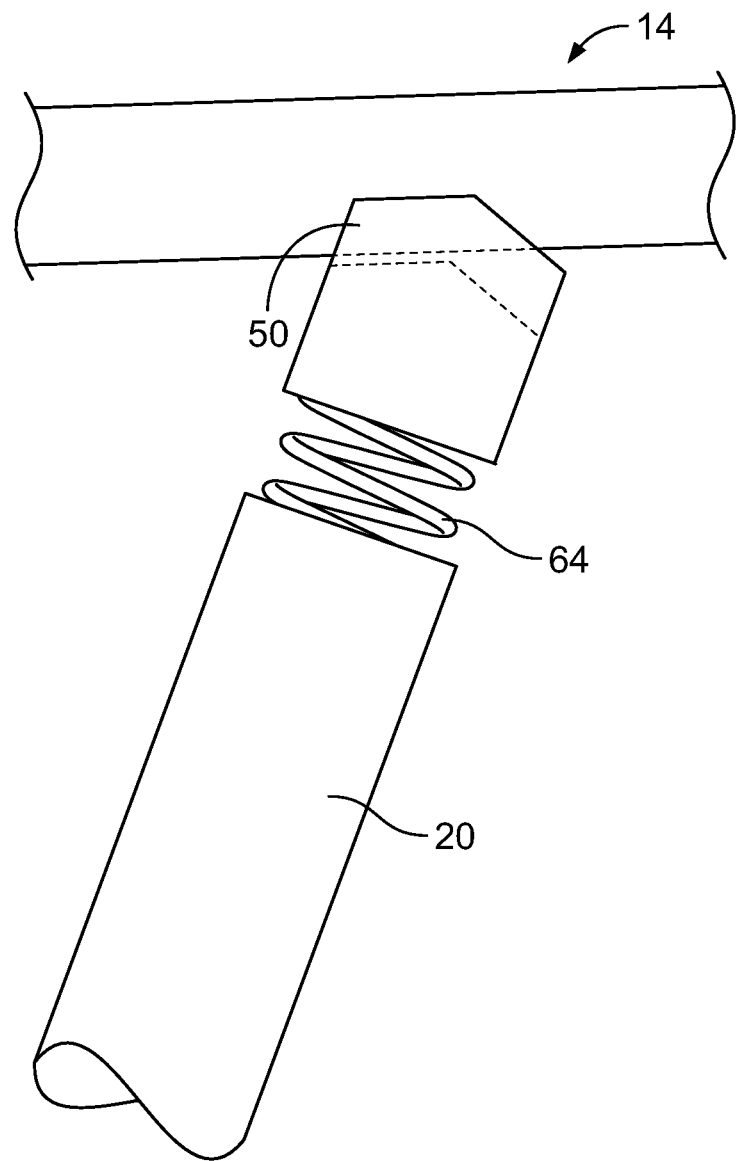
FIG. 17 shows another embodiment of a support pin including a spring connecting to a beam.
Figure 18:
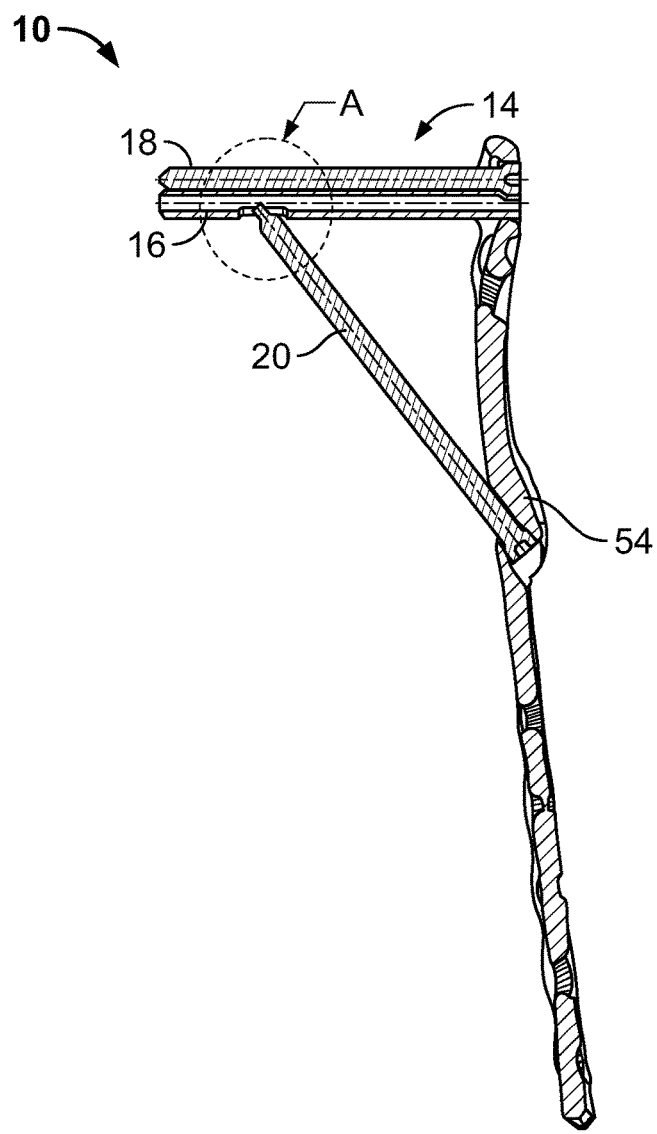
FIG. 18 shows a cross-sectional view of the fracture fixation system of FIG. 1.
Figure 19:
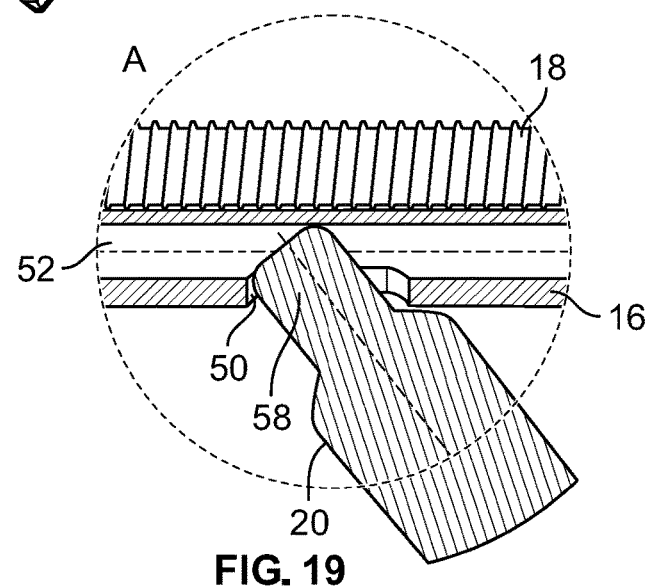
FIG. 19 shows an enlarged cross-sectional view of region A of the fracture fixation system of FIG. 18.
Figure 20:
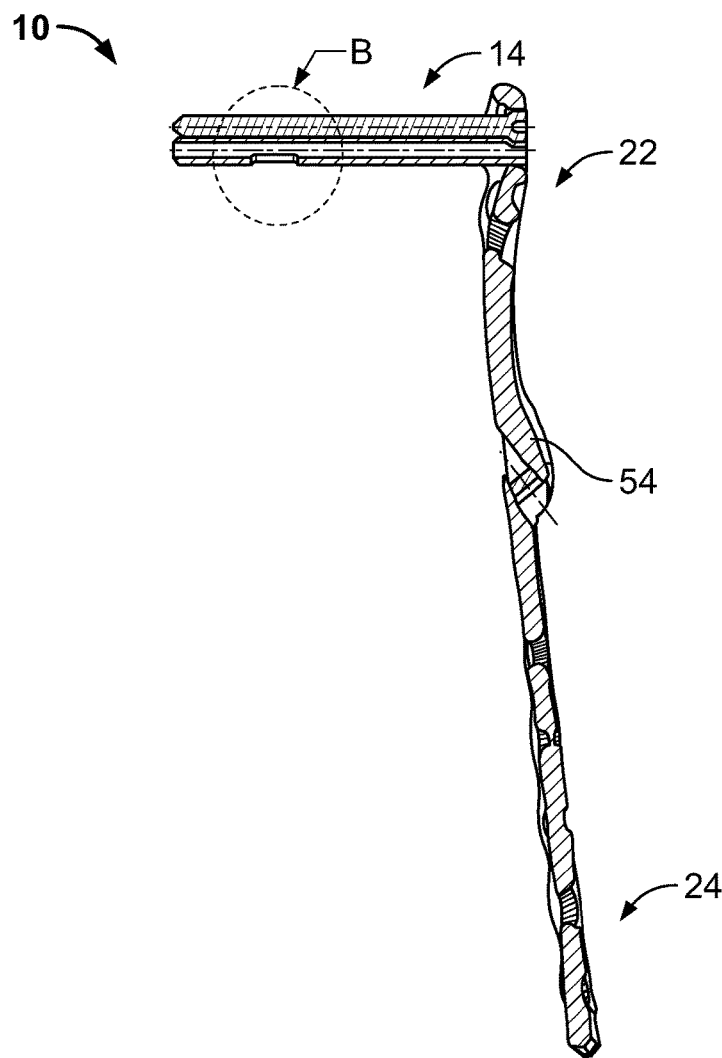
FIG. 20 shows a cross-sectional side view of the fracture fixation system of FIG. 1 according to one embodiment.
Figure 21:
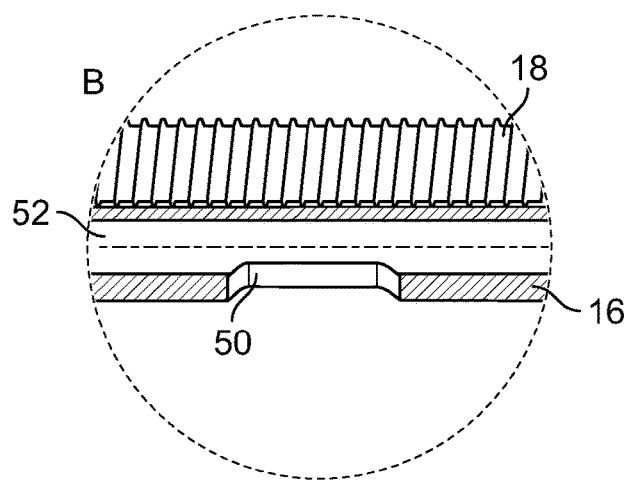
FIG. 21 shows an enlarged cross-sectional view of region B of the fracture fixation system of FIG. 20.
Figure 22:
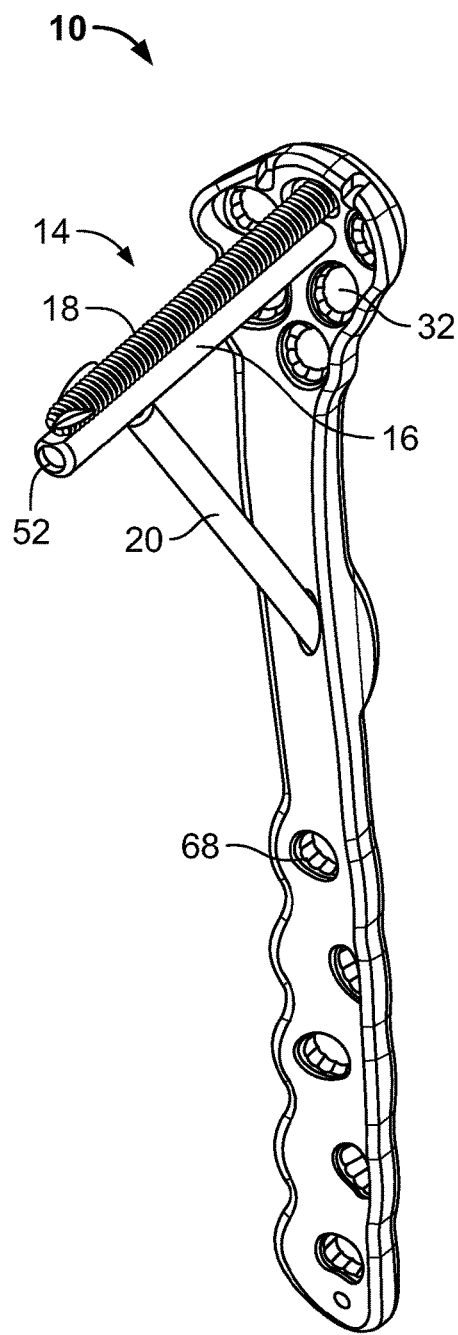
FIG. 22 shows a perspective view of the fracture fixation system of FIG. 1.
Figure 23:
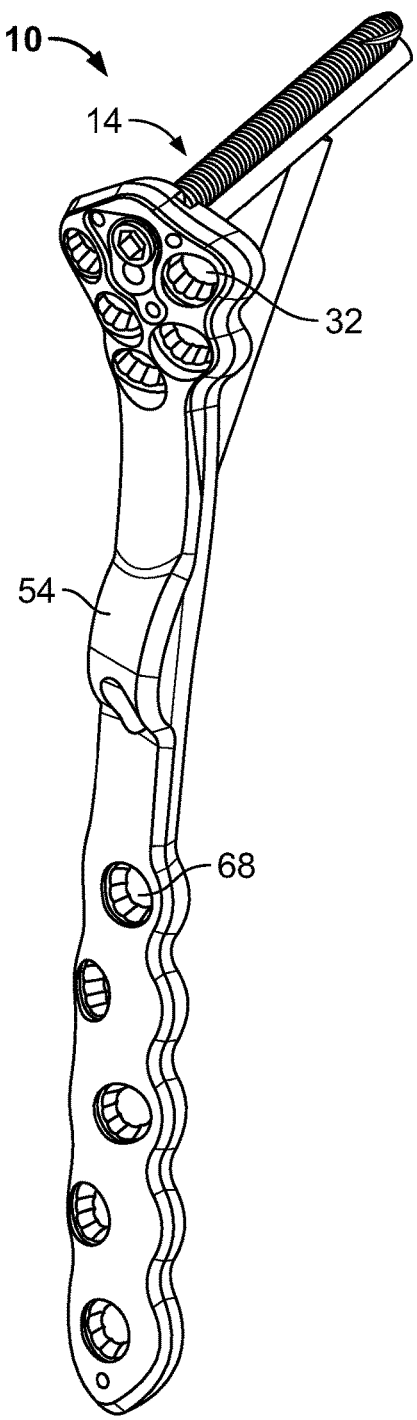
FIG. 23 shows another perspective view of the fracture fixation system of FIG. 1.

An oblong recess 50 is found on an opposed region of shank 48 from groove 46. Recess 50 is configured to engage with a distal end of support pin 20 and allow that distal end to travel under load. Recess 50 is preferably formed partially through shank 48 of peg 16 and does not extend completely through shank 48. However, in alternative embodiments, such as that seen in FIG. 16, recess 50 may extend entirely through beam 14. Recess 50 extends from an inferior surface of shank 48 into lumen 52 extending longitudinally through peg 16. This allows tip 58 of support pin 20 to extend into lumen 52 in an implanted configuration. Recess 50 may be substantially oblong, or it may be another shape adapted to engage with support pin 20. The oblong shape permits support pin 20 to maintain engagement despite flexing and bending of beam 14 and support pin 20 that may occur during loading and/or healing of the bone. Recess 50 may further include a lip 82 adapted to engage a shoulder 74 adjacent the narrowed tip of support pin 20 and prevent it from slipping out of recess 50.

A curved or bulged region 54 is formed in the second end 24 of bone plate 12. The bulged region 54 may extend in a lateral direction outward from the longitudinal axis of bone plate 12. Within the bulged region 54 is an aperture 56 for receiving a proximal end of support pin 20. Aperture 56 defines an axis at an offset angle relative to longitudinal axis of bone plate 12. The aperture axis extends at an angle preferably between 30° and 80°, e.g., 60°, such that a distal end of support pin 20 extends toward a distal end of beam 14. Bulged region 54 therefore provides added thickness of the plate in which to secure the head of support pin 20. Aperture 56 may include contouring features similar to those described in holes 32 in first end 22 of bone plate 12. The contouring features may allow insertion of support pin 20 at variable angles without sacrificing a strong connection between support pin 20 and aperture 56. Additionally, washers, plates, or other features to prevent support pin 20 from backing out of aperture 56 may be implemented. In an alternative embodiment where support pin is threaded, aperture 56 may have a similar thread pattern to accept the threaded support pin.

Figure 15:
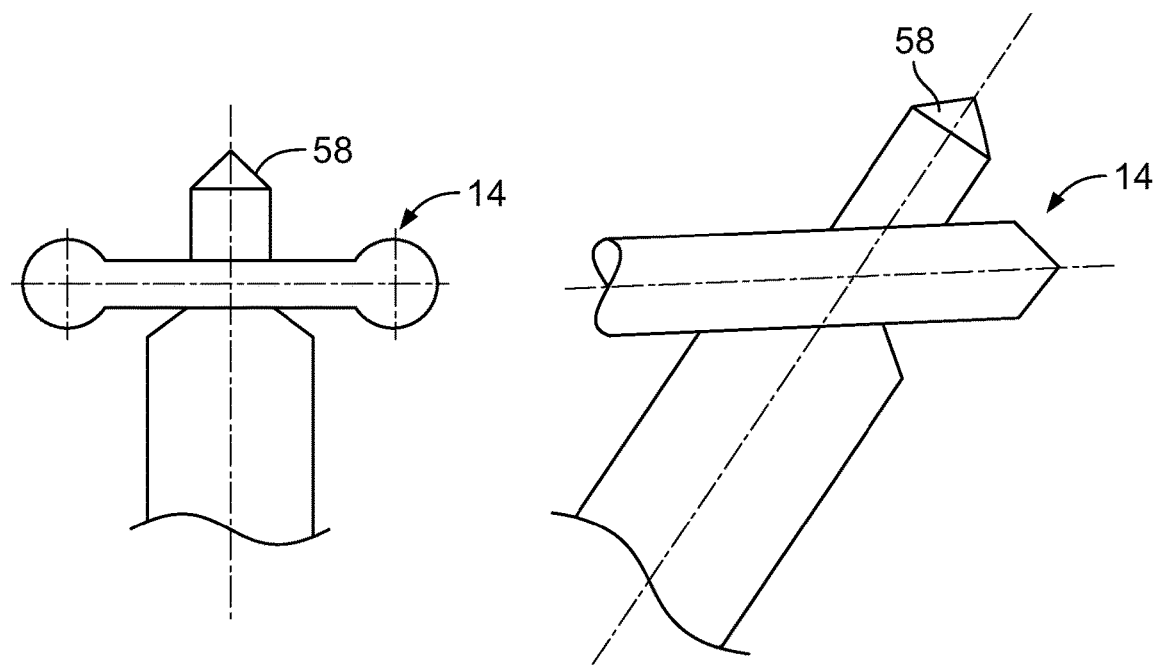
FIG. 15 shows alternative embodiments of a fracture fixation system where the support pin extends entirely through the beam.

Support pin 20, as depicted in FIGS. 2-6, is preferably unthreaded along its shank 80 and the shank 80 has a constant diameter from a proximal end to the tip 58 at a distal end. The distal end of shank 80 forms a tip 58 configured to engage with the recess 50 formed in support pin 20. Tip 58 includes shoulder 74 to decrease the diameter of tip 58 to a size smaller than the diameter of shank 80. Tip 58 may taper to a point to assist in guiding tip 58 through a predrilled pilot hole and through recess 50 in peg 16. Support pin 20 may be driven through bone plate 12 and the underlying bone by punching, hammering, or another form of driving support pin 20 through bone. In other embodiments such as those seen in FIG. 15, tip 58 may be driven entirely through beam 14 and may be secured in place using a barbell type fastener or another fixation type known in the art. In an engaged configuration in which tip 58 is secured within recess 50, tip 50 may glide within recess as the fracture fixation system 10 undergoes the load of the patient's bodyweight.

In another embodiment shown in FIGS. 11-12, support pin 20 may be a blade 60. Blade 60 has a substantially rectangular cross section that is thin enough to allow for advancement through bone without causing damage to bone while also giving the operator the option of twisting the blade during insertion. This thickness is preferably uniform across the entire length of blade 60. Blade 60 also has a substantially constant width and does not substantially taper toward its distal end.

Continuing with the embodiment of FIG. 11-12, blade 60 is twisted. The twisted portion is continuous and results in the distal region of the blade being rotated approximately 180° relative to proximal portion of the blade. In other embodiments, the twist may result in another degree of rotation, such as 90°, for a desired outcome. The purpose of the twisted blade embodiment is to provide additional structure support under the load of a person's bodyweight as the twisted blade may transfer forces throughout the bone better than a non-twisted blade would. A twisted blade may redirect during insertion as the operator maneuvers the blade toward the beam.

In another embodiment depicted in FIG. 13, support pin 20 may have a biasing element 64, such as a spring or a dampener, located along its longitudinal axis. As depicted, biasing element 64 is located at a distal end of support pin 20 adjacent to tip 58. When the fracture fixation system 10 is under stress from a person's body weight, biasing element 64 compresses to allow the load to transfer proximally along the support pin to the bone plate. This is advantageous as it limits the degree to which beam 14 flexes under stress and the degree to which the support pin 20 flexes when it lacks a biasing element.

In another alternative embodiment depicted in FIGS. 13-14, beam 14 may have a continuously twisted portion. This embodiment can be implemented in conjunction with any of the support pin embodiments described herein.

Figure 7:
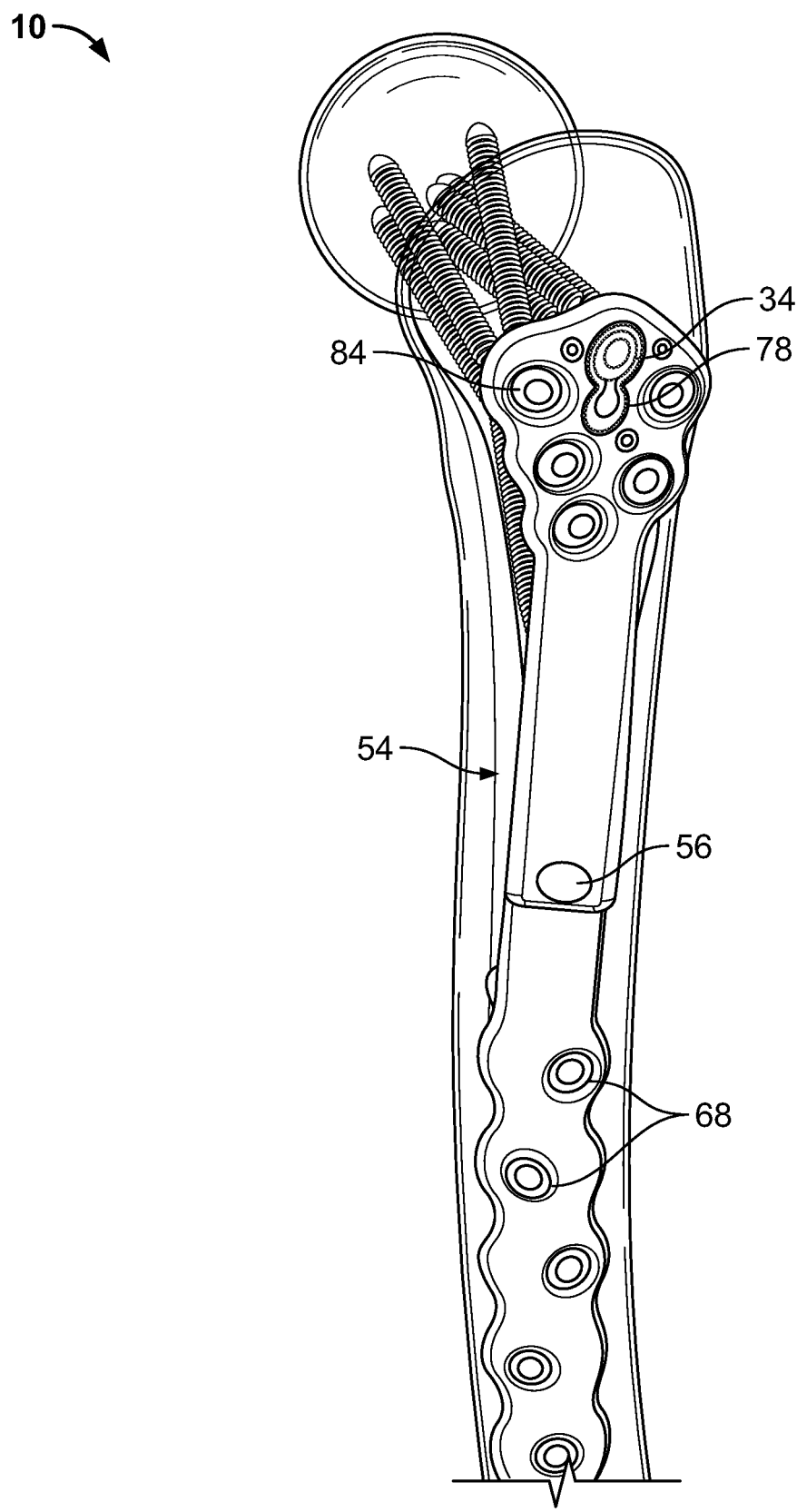
FIG. 7 is a perspective view of the fracture fixation system of FIG. 6 from a proximal view.

As depicted in FIG. 7, second end 24 of bone plate 12 may include any number of additional apertures 68 for fasteners to extend through. Apertures 68 may be located on alternating sides of a midline extending along the longitudinal axis of bone plate 12 as depicted, or any other arrangement known in the art. For example, apertures 68 could be located in pairs along the distal end of bone plate 12. Apertures 68 may have any number of fixation features described herein, such as unique geometries, washers, plates, etc., to limit the possibility of the fasteners backing out of apertures. Further, second end 24 of bone plate 12 may be curved about the longitudinal axis to aid in contouring to bone. This curvature allows for fasteners to extend at angles into the underlying bone to provide optimal fixation.

An exemplary method of implementing fracture fixation system 10 includes first placing the bone plate 12 against a bone, such as a femur. An operator may then use the apertures of bone plate 12 to act as guides for drilling pilot holes into the underlying bone. Separate drill guides can also be used with bone plate 12. This step allows the operator to analyze the condition of the underlying bone and determine the optimal configuration, i.e., the amount and orientation desired, for fasteners to secure bone plate 12 to the underlying bone.

Because peg 16 is monolithically constructed with beam collar 78, beam collar is then secured to slot 34 in bone plate 12. Peg 16 is inserted through slot 34 until beam collar 78 is secured within slot 34. Beam collar 78 may be compressed about gap 40 to a smaller size than slot 34 so that it snaps into place during insertion beneath a ledge 70 within bone plate 12.

Because peg 16 is unthreaded, a tool such as a punch or mallet may be utilized to drive peg 16 into the underlying bone. To simplify the process of inserting peg 16 into bone, a k-wire may be first inserted through the lumen of the peg and then through the bone plate and into the underlying bone. Once the k-wire is in place, the peg can be advanced distally along the k-wire until its distal end is secured in the femoral head. Peg 16 is driven in a manner where the longitudinal groove of peg 16 faces a superior direction where the adjacent screw will be located. Due to the monolithic construction of peg 16 and beam collar 78, peg 16 and beam collar 78 are advanced simultaneously. After peg 16 is secured within bone plate 12, screw 18 is driven distally through the adjacent aperture of beam collar 78. Because screw 18 is threaded, an appropriate insertion tool 72, such as a drill or a screwdriver, may be implemented to rotate screw 18 and cause it to travel distally within the internal threads of first half 36 and into the underlying bone. A drill sleeve depicted in FIG. 8 may also be utilized to assist in driving screw 18 distally. The drill sleeve includes a proximal sleeve 86 and a distal sleeve 88. The distal sleeve 88 defines a barrel 90 and is first implanted over slot 34. The proximal sleeve 86 is then inserted through barrel 90 to assist a user in drilling a hole for the peg 16 and screw 18 using insertion tool 72. Because of the orientation of peg 16, screw 18 extends distally into the femoral head while sitting in groove 46 of peg 16.

After beam 14 is secured, support pin 20 is driven distally into the underlying bone to provide support to beam 14. A drill guide 92 may be used to allow an operator to drill a hole through the bone before the support pin 20 is driven through bone. An insertion tool, such as a punch or mallet, may then be utilized to drive support pin 20 through aperture 56 distally at an angle toward a distal end of beam 14. The operator may then use the insertion tool (not shown) to engage bone plate 12 in an aligned manner that ensures tip 58 of support pin 20 aligns with recess 50 of peg 16. In alternative embodiments where support pin 20 extends entirely through beam 14, the operator ensures that the distal tip of the support pin extends entirely through beam 14.

Once the support pin 20 is in place, additional fasteners can be driven through the remaining apertures in the first end 22 and/or the second end 24 of bone plate 12 to provide additional fixation of bone plate 12 to the underlying bone.

Various forces act on fracture fixation system 10 in use. In prior art plates that do not include the generally triangular contour of beam 14 and/or the support pin 20, such plates span the comminuted fracture zone, and plate failures often occur within the sub-trochanteric regions representing the area of highest stresses within the implant's cross-section. The underlying concept of the present system foresees a reduction of stresses within the highly-loaded area in the sub-trochanteric area. This is achieved by utilizing the system in which the support pin 20 supports and applies a superior force against the beam 14 targeting the femoral head, thus reducing the bending moments and the stress level within the screws and the bone plate 12. Further fixation of the first end 22 is realized by a variety of further unsupported locking screws of various diameters. A stable construct with proper load transfer between beam 14 and support pin 20 is ultimately realized by the present system. As explained above, the triangular shape of fracture fixation system 10 reduces stress levels and bending moments in the components of the system. It is envisioned that different length components may be utilized to result in triangles of various sizes to reduce the stress levels and bending moments in different configurations.

In alternative embodiments, an operator can repeat the above steps using a blade. The blade can be utilized as a beam or a support pin according to the embodiments described in detail above. In embodiments where the blade 60 is twisted, the operator can use any twisting means known in the art to twist the blade through the patient's bone. Blade embodiments for the support pin may attach to the bone plate using similar attachment styles within an aperture of bone plate 12.

FIGS. 18-23 show various components of fracture fixation system 10 according to embodiments described herein.

Each component of fracture fixation system 10 may be formed by an additive manufacturing process, including but not limited to electron beam melting (EBM), selective laser sintering (SLS), selective laser melting (SLM), binder jet printing, and blown powder fusion for use with metal powders. This is particularly beneficial as the silhouette of the figure-8 shape or other non-circular shape can be made with a specific patient's anatomy in mind, specifically to narrow, widen, lengthen, and/or shorten any of the dimensions of fracture fixation system 10. Each component of fracture fixation system 10 can be made of any surgical grade material, and particularly various metals such as titanium, titanium alloys, stainless steel, cobalt chrome alloys, tantalum and niobium, or any combination thereof. Gold and/or silver can be provided in the material composition or as a coating of a component.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A fracture fixation system comprising:
    an elongated bone plate including a proximal end and a distal end, the proximal end defining a first hole;
    a beam including a peg extending along a peg axis and a screw extending along a screw axis, the beam having a first end and a second end; and
    a support pin including a first end and a second end,
    wherein, in an implanted configuration of the fracture fixation system, the peg axis is parallel to the screw axis such that the beam defines a figure-8 shape in a plane perpendicular to the peg and screw axes and the first end of the beam is engaged with the first hole of the bone plate, and
    wherein, in the implanted configuration, the first end of the support pin is engaged with a second hole of the bone plate that is located distally of the first hole in the bone plate, and the second end of the support pin is engaged with the second end of the beam, such that the second end of the support pin is disposed in an oblong recess in a side of the peg facing the distal end of the plate,
    wherein the support pin includes a tip at the second end thereof configured to engage with the recess of the peg, the tip including a shoulder of a diameter smaller than a diameter of a shank of the support pin, and wherein the recess includes a lip adapted to engage the shoulder of the peg adjacent the tip of the support pin.

2. The fracture fixation system of claim 1, wherein the second hole is located within a proximal-most two thirds of a length of the bone plate as measured between the proximal and distal ends of the bone plate.

3. The fracture fixation system of claim 1, wherein the peg has a head at the first end of the beam, the head defining a figure-8 shape in a plane perpendicular to the peg axis.

4. The fracture fixation system of claim 3, wherein the head of the peg is comprised of a first half of the figure-8 shape defining a first opening coaxial with the peg axis, and a second half of the figure-8 shape defining a second opening.

5. The fracture fixation system of claim 4, wherein the peg defines a lumen extending from the first opening through an entire length of the peg.

6. The fracture fixation system of claim 4, wherein the second opening of the second half of the figure-8 shape is internally threaded.

7. The fracture fixation system of claim 4, wherein the second half of the figure-8 shape is monolithically connected with the first half at a first side thereof, and defines an open gap at a second side thereof opposite the first side.

8. The fracture fixation system of claim 7, wherein the first hole of the plate has an outer ledge, and the head of the peg is configured to flex at the gap such that in the implanted configuration the head mates with the first hole past the outer ledge with a snap fit.

9. The fracture fixation system of claim 1, wherein a shaft of the peg connected to a head of the peg has a generally cylindrical outer surface intersected by a groove that is parallel to the peg axis.

10. The fracture fixation system of claim 9, wherein in the implanted configuration a portion of the screw is disposed within the groove of the shaft of the peg.

11. The fracture fixation system of claim 1, wherein the beam extends at an angle of 93 to 97 degrees with respect to the plate axis.

12. The fracture fixation system of claim 1, wherein the support pin is a blade.

13. A method of assembling a fracture fixation system, the method comprising:
inserting a peg of a beam through a first hole at a proximal end of an elongated bone plate;
inserting a screw of the beam through the first hole of the bone plate, wherein a peg axis along which the peg extends is parallel to a screw axis along which the screw extends such that the beam defines a figure-8 shape in a plane perpendicular to the peg and screw axes;
engaging a first end of a support pin into a second hole located distally of the first hole in the bone plate; and
engaging a second end of the support pin with the beam, such that the second end of the support pin is disposed in an oblong recess in a side of the peg facing the distal end of the plate,
wherein the support pin includes a tip at the second end thereof engaged with the recess of the peg, the tip including a shoulder of a diameter smaller than a diameter of a shank of the support pin, and
wherein the recess includes a lip engaged with the shoulder of the peg adjacent the tip of the support pin.

14. The method of claim 13, wherein:
the step of inserting the peg includes inserting a head of the peg into the first hole, the head defining a figure-8 shape in a plane perpendicular to the peg axis; and
the step of inserting the screw includes inserting the screw through an opening in the head of the peg.

15. The method of claim 13, wherein the step of inserting the screw includes threading a head of the screw into the opening in the head of the peg.

16. The method of claim 14, wherein the step of inserting the peg includes snapping the head of the peg into the first hole.

17. A fracture fixation system comprising:
an elongated bone plate including a proximal end and a distal end, the proximal end defining a first hole;
a beam including a peg extending along a peg axis and a screw extending along a screw axis, the beam having a first end and a second end; and
a support pin including a first end and a second end, wherein, in the implanted configuration, the first end of the support pin is engaged with a second hole of the bone plate that is located distally of the first hole in the bone plate, and the second end of the support pin is engaged with the second end of the beam,
wherein, in an implanted configuration of the fracture fixation system, the peg axis is parallel to the screw axis such that the beam defines a figure-8 shape in a plane perpendicular to the peg and screw axes and the first end of the beam is engaged with the first hole of the bone plate,
wherein the head of the peg is comprised of a first half of the figure-8 shape defining a first opening coaxial with the peg axis, and a second half of the figure-8 shape defining a second opening, and
wherein:
the second opening of the second half of the figure-8 shape is internally threaded, or
the second half of the figure-8 shape is monolithically connected with the first half at a first side thereof, and defines an open gap at a second side thereof opposite the first side.

* * * * *